United States Patent [19]

Nitz et al.

[11] Patent Number: 5,036,729
[45] Date of Patent: Aug. 6, 1991

[54] COAST-SYNC-COAST DOWNSHIFT CONTROL METHOD FOR CLUTCH-TO-CLUTCH TRANSMISSION SHIFTING

[75] Inventors: Larry T. Nitz, Troy; Rimas S. Milunas, Royal Oak; William J. Bolander, Clarkston, all of Mich.

[73] Assignee: Saturn Corporation, Troy, Mich.

[21] Appl. No.: 602,149

[22] Filed: Oct. 23, 1990

[51] Int. Cl.$^5$ ............................................. B60K 41/06
[52] U.S. Cl. ........................................ 74/866; 74/867; 74/868; 74/869; 364/424.1; 192/0.092
[58] Field of Search ................. 74/866, 867, 868, 869; 192/0.092; 364/424.1

[56] References Cited

U.S. PATENT DOCUMENTS

| | | | |
|---|---|---|---|
| 4,653,350 | 3/1987 | Downs et al. | 74/866 X |
| 4,653,351 | 3/1987 | Downs et al. | 74/869 X |
| 4,671,139 | 6/1987 | Downs et al. | 74/866 |
| 4,706,522 | 11/1987 | Nitz | 74/866 X |
| 4,707,789 | 11/1987 | Downs et al. | 364/424.1 |
| 4,796,490 | 1/1989 | Butts et al. | 74/877 X |
| 4,856,383 | 8/1989 | Rosen | 74/866 X |
| 4,891,759 | 1/1990 | Kato | 364/424.1 |

*Primary Examiner*—Allan D. Herrmann
*Assistant Examiner*—Daniel Wittels
*Attorney, Agent, or Firm*—Mark A. Navarre

[57] ABSTRACT

A coast-sync-coast control method for clutch-to-clutch shifting in which an engine control is employed to synchronize the engine speed with the transmission input speed at a point where the input speed would otherwise exceed the engine speed. The shift is referred to as a coast-sync-coast shift since (1) it is initiated at a coast condition where the input speed is higher than the engine speed, (2) it is completed at a synchronous condition where the speed differential across the on-coming clutch is at or near zero, and (3) a coast condition recurs immediately after the shift.

11 Claims, 10 Drawing Sheets

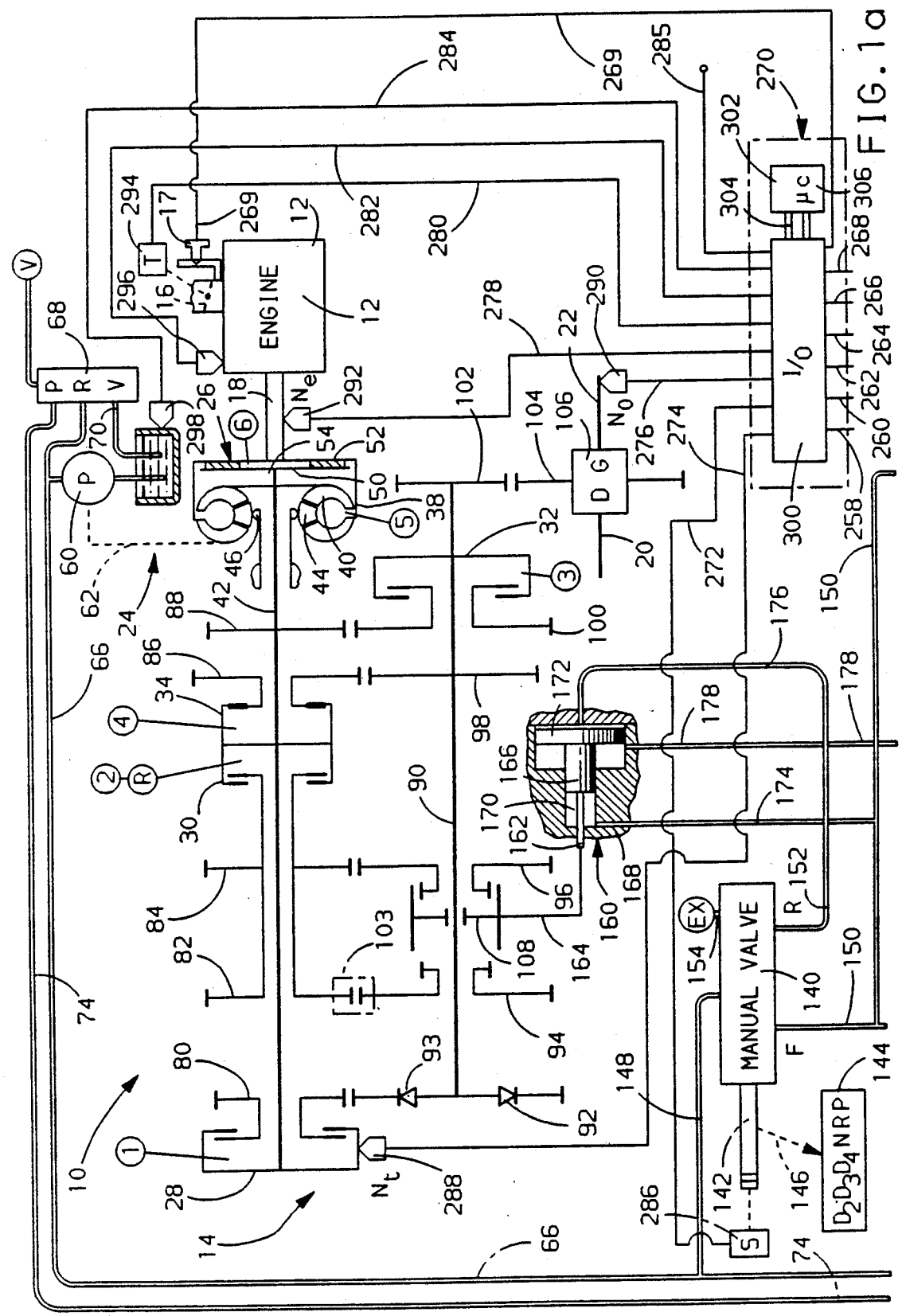

COAST-SYNC-COAST DOWNSHIFT CONTROL METHOD FOR CLUTCH-TO-CLUTCH TRANSMISSION SHIFTING

This invention relates to downshift controls in a multi-speed ratio clutch-to-clutch automatic shift transmission, and more particularly, to a control which provides coast-sync-coast downshifting.

BACKGROUND OF THE INVENTION

Motor vehicle transmissions of the type addressed by this invention include several fluid operated torque transmitting devices referred herein as clutches, which are automatically engaged and disengaged according to a predefined pattern to establish different speed ratios between input and output shafts of the transmission. The input shaft is coupled to an internal combustion engine through a fluid coupling such as a torque converter, and the output shaft is mechanically connected to drive one or more vehicle wheels.

The various speed ratios of the transmission are typically defined in terms of the ratio Ni/No, where Ni is the input shaft speed and No is the output shaft speed. Speed ratios having a relatively high numerical value provide a relatively low output speed and are generally referred to as lower speed ratios; speed ratios having a relatively low numerical value provide a relatively high output speed and are generally referred to as upper speed ratios.

Shifting between the various speed ratios generally involves disengaging a clutch associated with the current or actual speed ratio Ract, and engaging a clutch associated with the desired speed ratio Rdes. The clutch to be released is referred to as the off-going clutch, while the clutch to be engaged is referred to as the on-coming clutch. Shifts of this type are referred to as clutch-to-clutch in that no speed responsive or freewheeling elements are used.

Shifting is initiated in response to a comparison between measured and predetermined values of one or more load condition parameters. The parameters typically include vehicle speed so that the transmission is successively upshifted to the upper speed ratios as the vehicle speed is increased and successively downshifted to the lower speed ratios as the vehicle speed is decreased.

The present invention is directed to the control of clutch-to-clutch downshifting during coast conditions—that is, where the vehicle speed is decreasing, with or without application of the service brakes, at closed or light engine throttle settings. When performing coast downshifts, one objective is to time the shift so as to minimize driveline disruption. This means that the speed differential across the on-coming clutch should be at or near zero at the time of clutch engagement. Another objective is to maintain the establishment of a speed ratio which will provide adequate performance in the event the operator terminates the coast condition by increasing the engine throttle setting. This means that successive shifting should occur as the vehicle slows to a stop and that the neutral intervals between disengagement of an off-going clutch and engagement of an on-coming clutch should be minimized.

The above-noted objectives were addressed by the clutch-to-clutch shift control method disclosed and claimed in the U.S. Pat. No. 4,671,139 to Downs et al., assigned to General Motors Corporation, and issued on June 9, 1987. According to that control method, the coast downshifts are initiated after the transmission input speed drops below the neutral idle speed of the engine. The off-going clutch is released to initiate a neutral interval during which the input speed returns to the engine neutral idle speed. At this point, the on-coming clutch is engaged to complete the shift. In automotive terms, the shift is referred to as a drive-sync-drive shift since (1) it is initiated at a drive condition where the input speed is lower than the engine speed, (2) it is completed at a synchronous condition where the speed differential across the on-coming clutch is at or near zero, and (3) a drive condition recurs immediately after the shift. It is therefore inherent in this type of control that the coast downshifts occur at relatively low vehicle speeds.

SUMMARY OF THE INVENTION

The present invention is directed to a coast-sync-coast control method for clutch-to-clutch shifting in which an engine control is employed to synchronize the engine speed with the transmission input speed at a point where the input speed would otherwise exceed the engine speed. The shift is referred to as a coast-sync-coast shift since (1) it is initiated at a coast condition where the input speed is higher than the engine speed, (2) it is completed at a synchronous condition where the speed differential across the on-coming clutch is at or near zero, and (3) a coast condition recurs immediately after the shift.

In operation, the coast-sync-coast downshift according to this invention, comprises Preamble, Neutral, Fill and Completion phases. In the Preamble phase, the torque converter is released (if locked), and the engine control is adjusted to progressively increase the engine speed. In the preferred embodiment, the engine control is achieved via adjustment of an idle air control (IAC) unit which admits a controlled amount of air downstream of the engine throttle for idle speed regulation. In this mechanization, the IAC unit is adjusted to a limit value which defines a known flow condition, the limit value being scheduled in relation to a measure of the barometric pressure so that the known flow condition occurs regardless of altitude. When the speed differential across the torque converter indicates that the engine torque is sufficient to accelerate the input shaft of the transmission, the control enters the Neutral phase.

In the Neutral phase, the off-going clutch is disengaged to allow the transmission input speed to rise toward the synchronous speed of the lower speed ratio. When the input speed nears the synchronous speed, the engine control is removed to avoid overshooting and the control enters the Fill phase.

In the Fill phase, the on-coming clutch is filled with transmission fluid in preparation for engagement, and the engine control is modulated, if necessary, to maintain the input speed substantially at the synchronous speed. When the on-coming clutch is ready for engagement, the control enters the Completion phase during which the engine control is returned to its normal setting and the pressure supplied to the on-coming clutch is progressively increased to engage the clutch and complete the shift.

With the above-described control, coast downshifts may be initiated at relatively high vehicle speeds, retaining minimal driveline disruption due to the synchronous shift completion. In a mechanization of a clutch-to-clutch transmission control employing this invention, the control includes driver preference Performance/Economy mode selection. The subject coast-sync-coast control is primarily used when the Performance mode is selected and the above-referenced drive-sync-drive control is primarily used when the Economy mode is selected.

BRIEF DESCRIPTION OF THE DRAWINGS

FIGS. 1a-1b schematically depict a computer-based electronic transmission control system controlled according to this invention.

DETAILED DESCRIPTION OF THE DRAWINGS

Figure 1B:
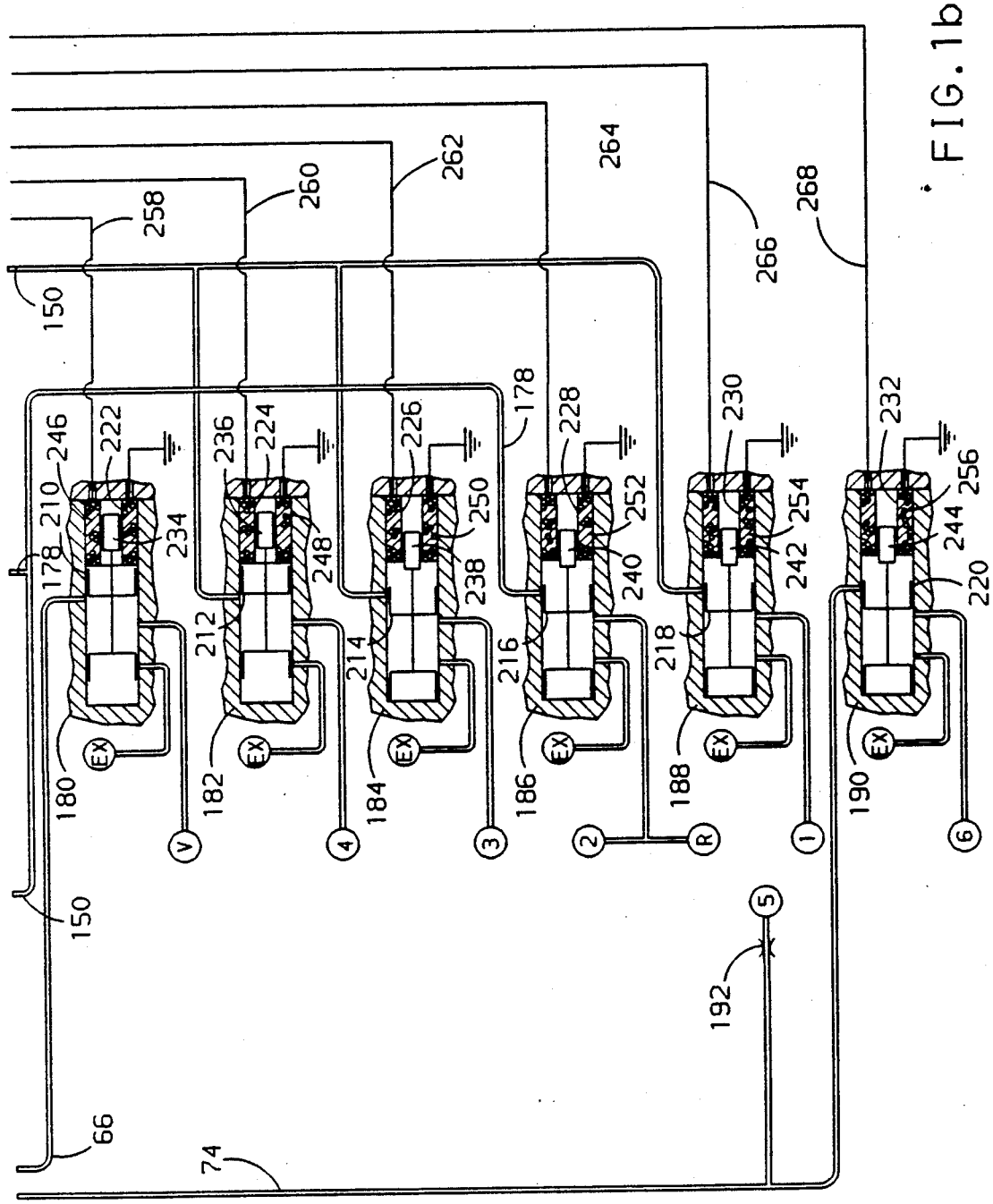

Referring particularly to FIGS. 1a and 1b, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device, such as an accelerator pedal (not shown), for regulating the air intake of the transmission. An idle air control (IAC) unit 17, as is conventionally employed for idle speed regulation in various vehicles manufactured and sold by General Motors Corporation, defines a by-pass path through which a limited amount of auxiliary air is admitted downstream of the throttle 16. The IAC unit 17 is electrically controlled via line 269 to regulate the amount of by-pass air. The engine is fueled by a conventional method in relation to the combined air intake to produce output torque in proportion thereto. Such torque is applied to the transmission 14 through the engine output shaft 18. The transmission 14, in turn, transmits engine output torque to a pair of drive axles 20 and 22 through a torque converter 24 and one or more of the fluid operated clutches 26-34, such clutches being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14. The torque converter 24 also includes a clutch 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56. When the fluid pressure in the apply chamber 54 exceeds that in the release chamber 56, the friction surface 52 of clutch plate 50 is moved into engagement with the input shell 38 as shown in FIG. 1, thereby engaging the clutch 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36 as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the Schuster U.S. Pat. No. 4,342,545 issued Aug. 3, 1982, and a representative pressure regulator valve is disclosed in the Vukovich U.S. Pat. No. 4,283,970 issued Aug. 18, 1981, such patents being assigned to General Motors Corporation.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutches 28-34 each comprise an input member rigidly connected to a transmission shaft 42 or 90, and an output member rigidly connected to one or more gear elements such that engagement of a clutch couples the respective gear element and shaft to effect a driving connection between the shafts 42 and 90. The clutch 28 couples the shaft 42 to the gear element 80; the clutch 30 couples the shaft 42 to the gear elements 82 and 84; the clutch 32 couples the shaft 90 to the gear element 100; and the clutch 34 couples the shaft 42 to the gear element 86. Each of the clutches 28-34 is biased toward a disengaged state by a return spring (not shown). Engagement of the clutch is effected by supplying fluid pressure to an apply chamber thereof. The resulting torque capacity of the clutch is a function of the applied pressure less the return spring pressure, hereinafter referred to as the working pressure pressure. The circled numeral 1 represents a fluid passage for supplying pressurized fluid to the apply chamber of clutch 28; the circled numeral 2 and letter R represent a fluid passage for supplying pressurized fluid to the apply chamber of the clutch 30; the circled numeral 3 represents a fluid passage for supplying pressurized fluid to the apply chamber of the clutch 32; and the circled numeral 4 represents a fluid passage for directing pressurized fluid to the apply chamber of the clutch 34.

The various gear elements 80-88 and 92-100 are relatively sized such that engagement of first, second, third and fourth forward speed ratios are effected by engaging the clutches 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutches 28-34 in a released condition. The speed ratios defined by the various gear element pairs are generally characterized by the ratio of the turbine speed Nt to output speed No. Representative Nt/No ratios for transmission 14 are as follows:

| First - 2.368 | Second - 1.273 |
|---|---|
| Third - 0.808 | Fourth - 0.585 |
| Reverse - 1.880 | |

Clutch-to-clutch shifting from a current speed ratio to a desired speed ratio requires the disengagement of an off-going clutch associated with the current speed ratio and the engagement of an on-coming clutch associated with the desired speed ratio. For example, a downshift from the Fourth speed ratio to the Third speed ratio involves disengagement of the clutch 34 and engagement of the clutch 32. As described in detail below, the present invention is directed to a control method for performing clutch-to-clutch downshifts under coast conditions such that the shift is initiated during a coast condition, completed at a synchronous condition, and followed by a coast condition. This is referred to herein as a coast-sync-coast downshift.

The fluid control elements for effecting engagement and disengagement of the clutches 26-34 include a manual valve 140, a directional servo 160 and a plurality of electrically operated fluid valves 180-190. The manual valve 140 operates in response to operator demand and serves, in conjunction with directional servo 160, to direct regulated line pressure to the appropriate fluid valves 182-188. The fluid valves 182-188, in turn, are individually controlled to direct fluid pressure to the clutches 28-34. The fluid valve 180 is controlled to direct fluid pressure from the pump output line 66 to the pressure regulator valve 68, and the fluid valve 190 is controlled to direct fluid pressure from the line 74 to the clutch 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148 and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3, or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutch 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60, and are individually controlled to direct fluid pressure to the pressure regulator valve 68 or respective clutches 26-34. The fluid valve 180 receives line pressure directly from pump output line 66, and is controlled to direct a variable amount of such pressure to the pressure regulator valve 68 as indicated by the circled letter V. The fluid valves 182, 186 and 188 receive fluid pressure from the forward output line 150 of manual valve 140, and are controlled to direct variable amounts of such pressure to the clutches 34, 32 and 28 as indicated by the circled numerals 4, 3 and 1, respectively. The fluid valve 186 receives fluid pressure from the forward output line 150 and the directional servo output line 178, and is controlled to direct a variable amount of such pressure to the clutch 30 as indicated by the circled numeral 2 and the circled letter R. The fluid valve 190 receives fluid pressure from line 74 of pressure regulator valve 68, and is controlled to direct a variable amount of such pressure to the release chamber 56 of the clutch 26 as indicated by the circled numeral 6. The apply chamber 54 of the clutch 26 is supplied with fluid pressure from the output line 74 via the orifice 192 as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1, the input and output passages are connected. Each of the fluid valves 180-190 includes an exhaust passage as indicated by the circled letters EX, such passage serving to drain fluid from the respective clutch when the spool element is shifted to the leftmost position as viewed in FIG. 1. In FIG. 1, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 surrounding the respective plunger. One terminal of each such solenoid coil 246-256 is connected to ground potential as shown, and the other terminal is connected to an output line 258-268 of a control unit 270 which governs the solenoid coil energization. As set forth hereinafter, the control unit 270 pulse-width-modulates the solenoid coils 246-256 according to a predetermined control algorithm to regulate the fluid pressure supplied to the pressure regulator 68 and the clutches 26-34, the duty cycle of such modulation being determined in relation to the desired magnitude of the supplied pressures.

Input signals for the control unit 270 are provided on the input lines 272-285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission input shaft 42 and therefore the turbine or transmission input speed Nt; the speed transducer 290 senses the velocity of the drive axle 22 and therefore the transmission output speed No; and the speed transducer 292 senses the velocity of the engine output shaft 18 and therefore the engine speed Ne. The position transducer (T) 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. The barometric pressure, used in connection with the IAC control according to this invention, is calculated as a function of the MAP signal on line 282. A temperature sensor 298 senses the temperature of the oil in the transmission fluid reservoir 64 and provides an electrical signal in accordance therewith to control unit 270 via line 284. A shift mode selection switch 299 mounted on the vehicle instrument panel (not shown) provides an input on line 285 indicating driver selection of the Normal or Performance shift modes.

The control unit 270 responds to the input signals on input lines 272-285 according to a predetermined control algorithm as set forth herein, for controlling the operation of idle air unit 17 and fluid valve solenoid coils 246-256 via output lines 258-269. As such, the control unit 270 includes an input/output (I/O) device 300 for receiving the input signals and outputting the various control signals, and a microcomputer 302 which communicates with the I/O device 300 via an address-and-control bus 304 and a bi-directional data bus 306. In the case of IAC unit 17, the control may be effected directly by the control unit 270 as shown, or by an engine control unit (not shown) which operates in response to the control signal generated by control unit 270 on line 269.

Figure 2:
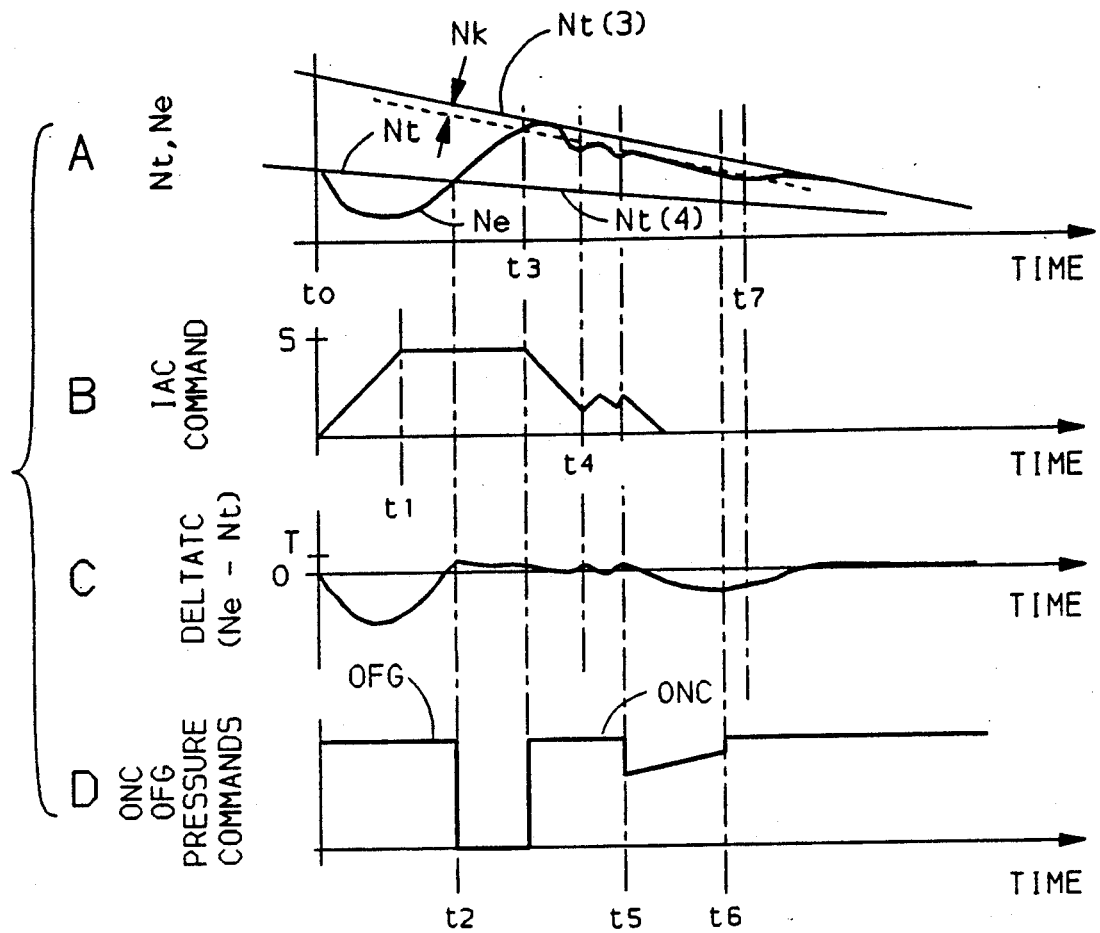
FIGS. 2-3 graphically depict various transmission and control parameters occurring in the course of coast-sync-coast downshifting according to this invention.

FIG. 2 graphically depicts a 4-3 coast-sync-coast downshift according to the present invention for the clutch-to-clutch automatic transmission of FIGS. 1a-1b. Graph A depicts the engine speed Ne, as well as the synchronous speeds Nt(3) and Nt(4) for the 3rd and 4th speed ratios, respectively. Graph B depicts the command for IAC unit 17; Graph C depicts the speed differential DELTATC across the torque converter 24; and Graph D depicts the on-coming and off-going clutch pressure commands.

Coast-sync-coast downshifts according to the invention comprise Preamble, Neutral, Fill and Completion phases. The Preamble phase is initiated at time t0 in response to the achievement of a specified vehicle speed and engine throttle condition. At such point, the torque converter clutch 26 is disengaged (if engaged), and the setting of the IAC unit 17 is progressively increased toward a limit setting S, reaching the setting at time t1. The limit setting S defines a known air flow condition at sea level, and is scheduled in relation to the barometric pressure indication such that the known flow condition occurs regardless of altitude.

Although the turbine speed Nt remains at the synchronous speed Nt(4) of the 4th speed ratio, the release of converter clutch 26 allows the engine speed Ne to fall toward its idle setting, as seen in the Ne trace of Graph A and as reflected in the DELTATC trace of Graph C. Shortly thereafter, however, the increased air intake supplied by IAC unit 17 catches and accelerates the engine, narrowing the gap between Ne and Nt.

At time t2, DELTATC reaches a small positive threshold T, indicating that the engine torque is sufficient to accelerate the turbine shaft 42 to the synchronous speed Nt(3) of the 3rd speed ratio. At this point, the control enters the Neutral phase by disengaging the off-going clutch 34. This allows the engine and turbine speeds Ne, Nt to rise substantially together toward Nt(3). As a back-up measure, the control will independently release off-going clutch 34 a predetermined time after shift initiation if the primary condition (DELTATC>T) has not already been observed.

At time t3, the turbine speed Nt is within a predetermined speed Nk of Nt(3), and the control enters the Fill phase. In the Fill phase, the engine idle air control command is ramped toward zero to avoid overshooting of the synchronous speed Nt(3), and the apply cavity of on-coming clutch 32 is filled with fluid in preparation for engagement. As a back-up measure, the control will independently initiate the on-coming fill period a predetermined time after the off-going release if the primary condition (Nt(3)−Nt<Nk) has not already been observed. In this case, the predetermined time is determined as a function of the required change in turbine speed so as to allow Nt to substantially reach the synchronous speed Nt(3).

In the event that the turbine speed falls below the synchronous speed Nt(3) during the fill period of on-coming clutch 32, the idle air control command is modulated in closed-loop fashion, as seen in the interval t4–t5, in order to maintain Nt substantially at Nt(3)−Nk. When the on-coming clutch fill period is over at time t5, the control enters the Completion phase. In the Completion phase, the idle air command is ramped to zero and the pressure supplied to on-coming clutch 32 is progressively increased to engage the clutch 32. A coast condition then recurs as the turbine speed Nt is brought into correspondence with the synchronous speed Nt(3). At time t6, the clutch 32 is fully engaged, completing the shift. As an optional measure, the torque converter clutch 26 is progressively re-engaged beginning at time t7.

Figure 3:
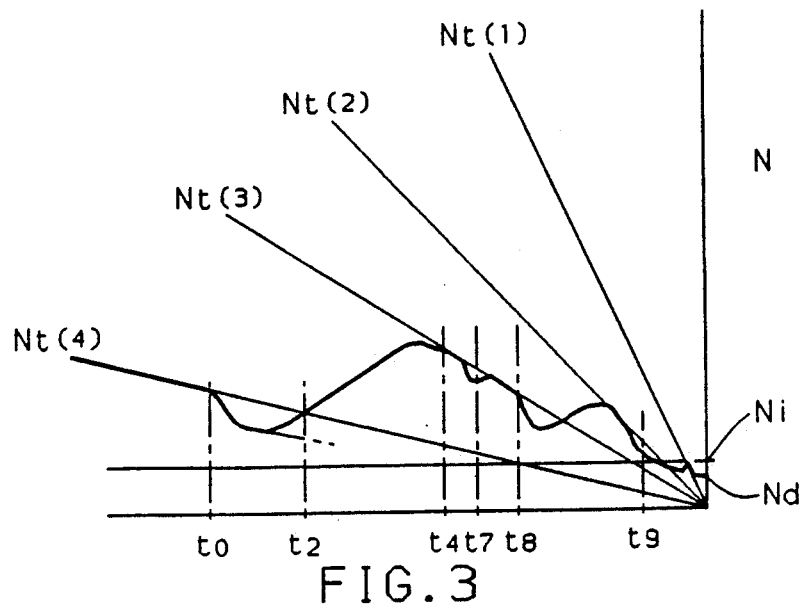

FIG. 3 graphically depicts successive 4-3, 3-2 and 2-1 coast-sync-coast downshifts according to this invention. Consistent with FIG. 2, the synchronous speeds for the 1st, 2nd, 3rd and 4th speed ratios are designated as Nt(1), Nt(2), Nt(3) and Nt(4), respectively. Ni represents the neutral or unloaded engine idle speed and Nd represents the drive or loaded engine idle speed. The actual engine speed Ne, depicted as a heavy trace, initially coincides with Nt(4) due to engagement of the clutches 26 and 34. In the interval of t0–t7, a 4-3 coast-sync-coast downshift occurs substantially as described above in reference to FIG. 2. Thus, Ne falls below Nt(4) with the release of torque converter clutch 26 and off-going clutch 34, reaches and is held substantially at Nt(3) with the control of IAC unit 17, re-enters a coast condition after the engagement of on-coming clutch 32, and returns to Nt(3) with re-engagement of torque converter clutch 26. Similar events occur in the interval of t8–t9 with the passage of the 3-2 coast-sync-coast downshift, while the 2-1 downshift is performed substantially as described in the above-referenced U.S. Pat. No. 4,671,139. In a mechanization of the subject controls, the Performance mode 4-3 and 3-2, as well as the Economy mode 4-3, are carried out according to this invention, and the remaining coast downshifts are carried out as set forth in the U.S. Pat. No. 4,671,139.

Figure 4:
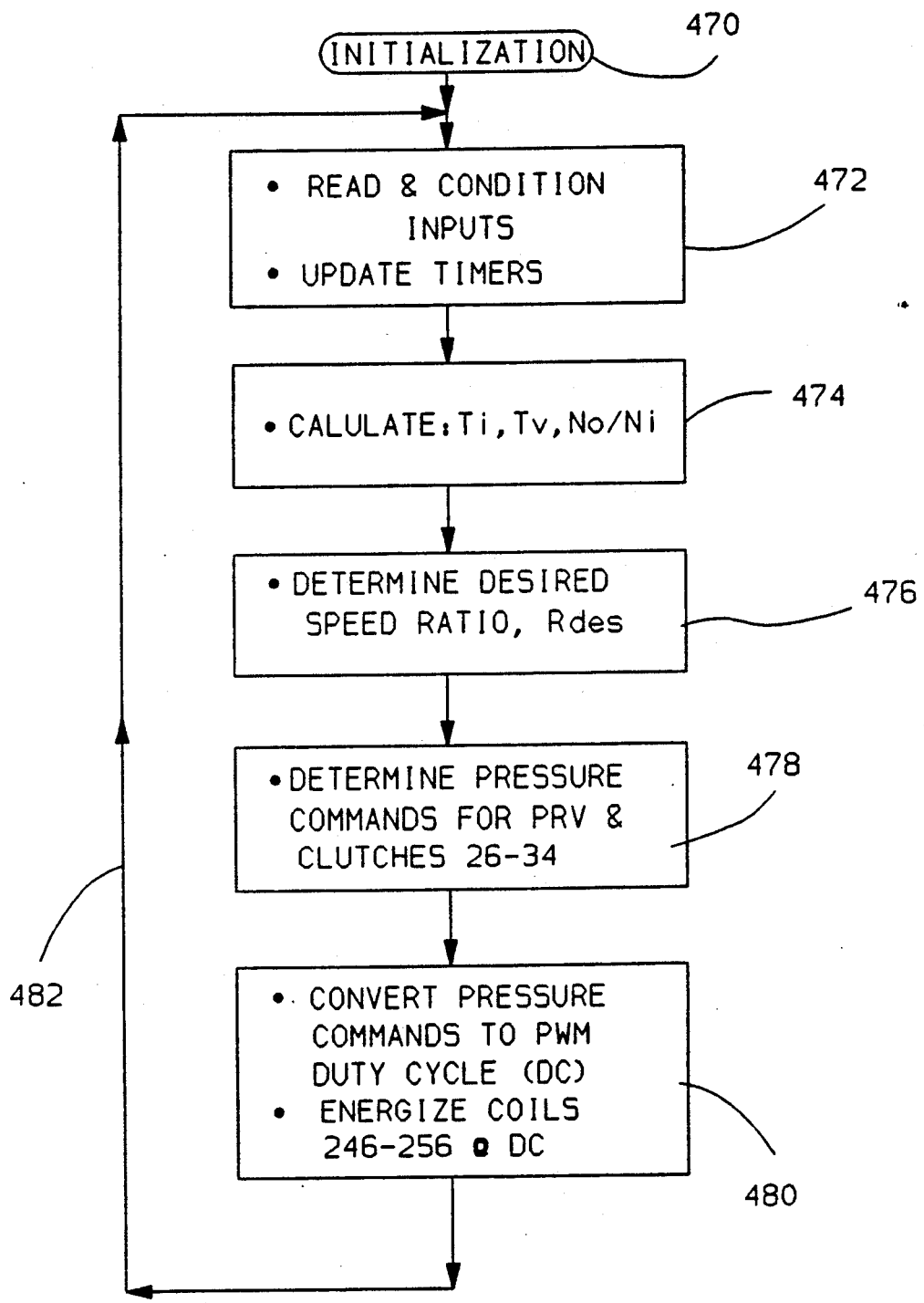
FIGS. 4, 5, 6, 7, 8a, 8b and 9 depict flow diagrams executed by the computer-based controller of FIG. 1a in carrying out the control method of this invention.

The flow diagrams depicted in FIGS. 4, 5, 6, 7, 8a, 8b and 9 represent program instructions to be executed by the microcomputer 302 of control unit 270 in mechanizing coast-sync-coast downshifting according to this invention. The flow diagram of FIG. 4 represents a main or executive program which calls various subroutines for executing particular control functions as necessary. The flow diagrams of FIGS. 5–9 represent the functions performed by those subroutines which are pertinent to the present invention.

Referring now more particularly to FIG. 4, the reference numeral 470 designates a set of program instructions executed at the initiation of each period of vehicle operation for initializing the various tables, timers, etc., used in carrying out the control functions of this invention. Following such initialization, the instruction blocks 472–480 are repeatedly executed in sequence as designated by the flow diagram lines connecting such instruction blocks and the return line 482. Instruction block 472 reads and conditions the various input signals applied to I/O device 300 via the lines 272–285, and updates (increments) the various control unit timers. Instruction block 474 calculates various terms used in the control algorithms, including the input torque Ti, the torque variable Tv, and the speed ratio No/Ni. Instruction block 476 determines the desired speed ratio, Rdes, in accordance with a number of inputs including throttle position, vehicle speed, and manual valve position. In transmission control, this function is generally referred to as shift pattern generation. Instruction block 478 determines the clutch pressure commands for effecting a ratio shift, if required. The IAC command and the pressure commands for the pressure regulator valve PRV and nonshifting clutches are also determined. An expanded description of the instruction block 478, especially in relation to coast downshifting, is set forth below in reference to the flow diagrams of FIGS. 5–9. Instruction block 480 converts the clutch and PRV pressure commands to PWM duty cycle based on the operating characteristics of the various actuators, and energizes the actuator coils accordingly.

Figure 5:
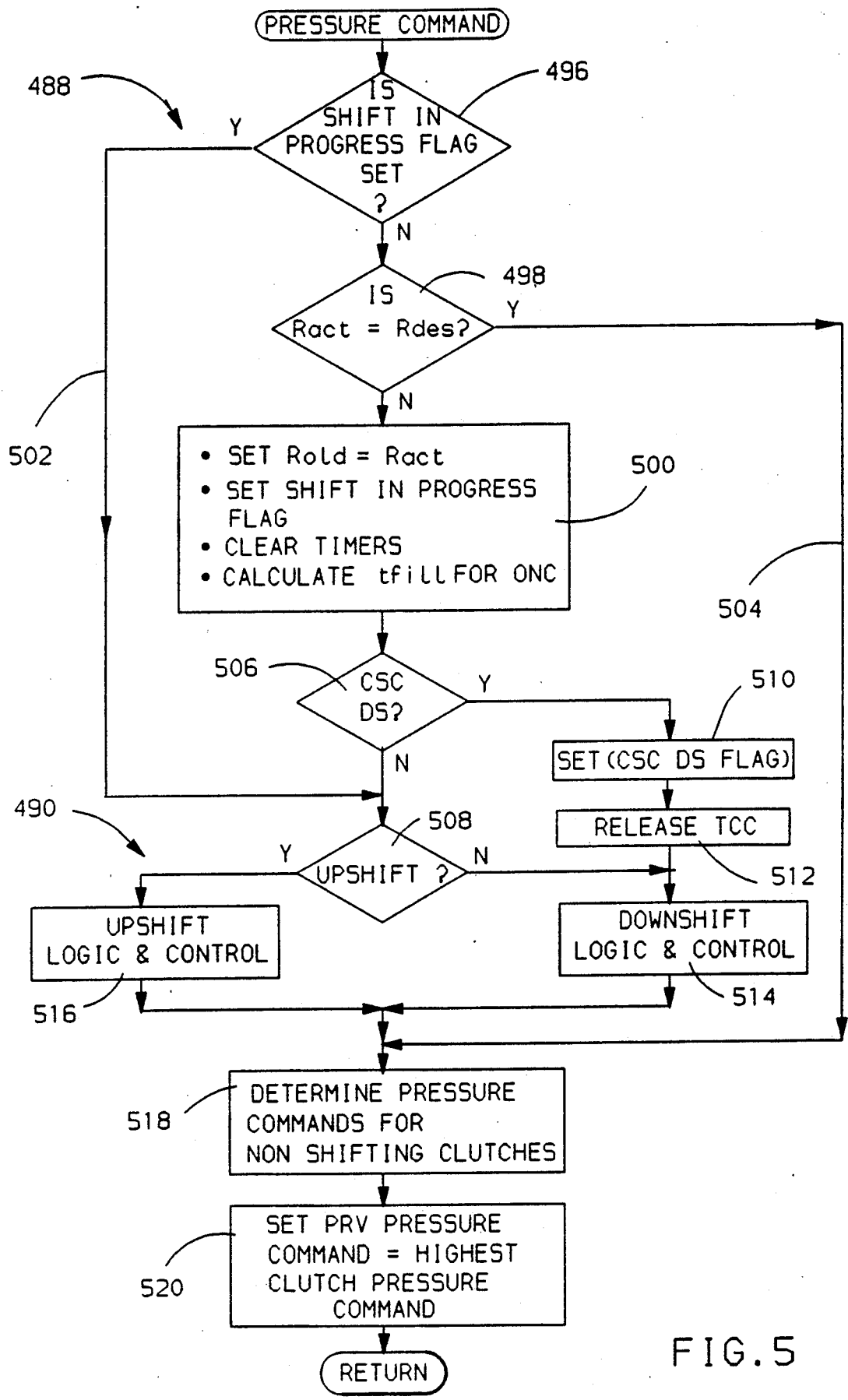

Referring to the PRESSURE COMMAND routine diagrammed in FIGS. 5–9, and particularly to FIG. 5, the blocks designated by the reference numeral 488 include the decision block 496 for determining if a shift is in progress as indicated by the "SHIFT IN PROGRESS" flag; the decision block 498 for determining if the actual speed ratio Ract is equal to the desired speed ratio Rdes determined at instruction block 476 of FIG. 4; and the instruction block 500 for setting up the initial conditions for a ratio shift. The instruction block 500 is only executed when decision blocks 496 and 498 are both answered in the negative. In such case, instruction block 500 serves to set the old ratio variable, Rold, equal to Ract, to set the "SHIFT IN PROGRESS" flag, clear the shift timers, and to calculate the fill time tfill for the on-coming clutch. A suitable calculation for the fill time tfill is set forth in the U.S. Pat. No. 4,653,350 to Downs et al., issued on Mar. 31, 1987. If a shift is in progress, the execution of blocks 498 and 500 is skipped, as indicated by the flow diagram line 502. If no shift is in progress, and the actual ratio equals the desired ratio, the execution of instruction block 500 and the blocks designated by the reference numeral 490 is skipped, as indicated by the flow diagram line 504.

The blocks designated by the reference numeral 490 include the decision block 506 for determining if the shift is a coast-sync-coast downshift (CSC DS) and the decision block 508 for determining if the shift is an upshift or a normal pattern downshift. If the shift is a coast-sync-coast downshift, the instruction blocks 510–512 are executed to set the CSC DS flag and to release the torque converter clutch 26 before calling the normal Downshift Logic & Control routine. The Downshift Logic & Control routine is further detailed in the flow diagrams of FIGS. 6–9, but in general, develops pressure commands for the on-coming and off-going clutches of the shift. Similarly, the Upshift Logic and Control routine of block 516 is executed to develop pressure commands for on-coming and off-going clutches if the shift is an upshift.

Once the pressure commands, if any, for the on-coming and off-going clutches have been determined, the instruction blocks 518-520 are executed to determine pressure commands for the nonshifting clutches and to set the pressure command for the pressure regulator valve PRV to the highest of the clutch pressure commands.

Figure 6:
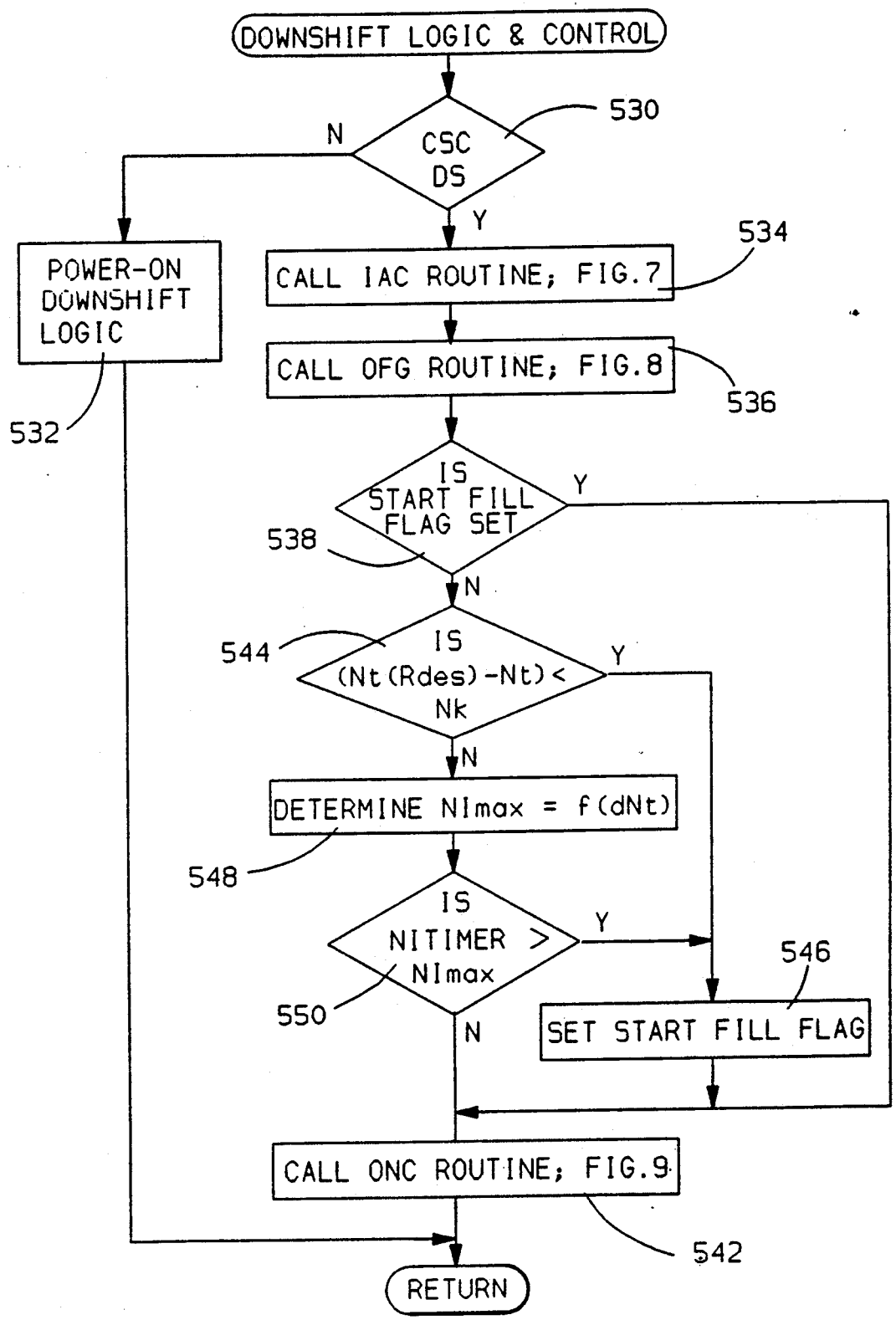

Referring to the Downshift Logic & Control routine of FIGS. 6-9, and more particularly to FIG. 6, the decision block 530 is first executed to determine if the CSC DS flag is set. If not, the instruction block 532 is executed to develop clutch pressure commands for a power-on downshift, as disclosed for example, in the U.S. Pat. No. 4,653,351 to Downs et al., issued Mar. 31, 1987. If the CSC DS flag is set, instruction blocks 534 and 536 are executed to call the IAC and OFG routines. The IAC routine is detailed in FIG. 7 as indicated, and serves to develop the position command for IAC unit 17. The OFG routine is detailed in FIGS. 8a-8b, and develops the pressure command for the off-going clutch involved in the shift.

If the Fill phase has already begun, as determined at decision block 538, execution of the flow diagram portion 540 is skipped, and the ONC routine is called by the block 542. The ONC routine is detailed in FIG. 9 as indicated, and serves to develop the pressure command for the on-coming clutch involved in the shift. If the Fill phase has not yet begun, the flow diagram portion 540 is executed to determine if the Fill phase should be started. If the turbine speed Nt is within a predetermined value Nk of the synchronous speed for the desired ratio, Nt(Rdes), as determined at decision block 544, the instruction block 546 is executed to set the START FILL flag prior to calling the ONC routine of FIG. 9. Prior to the fulfillment of decision block 544, however, the blocks 548 and 550 are executed to independently set the START FILL flag if the Neutral phase interval exceeds a time out value. The time out value, NImax, is determined at block 548 as a function of the required change in turbine speed dNt for the shift, and the block 550 determines if the count in a neutral interval timer, NITIMER, exceeds NImax.

Figure 7:
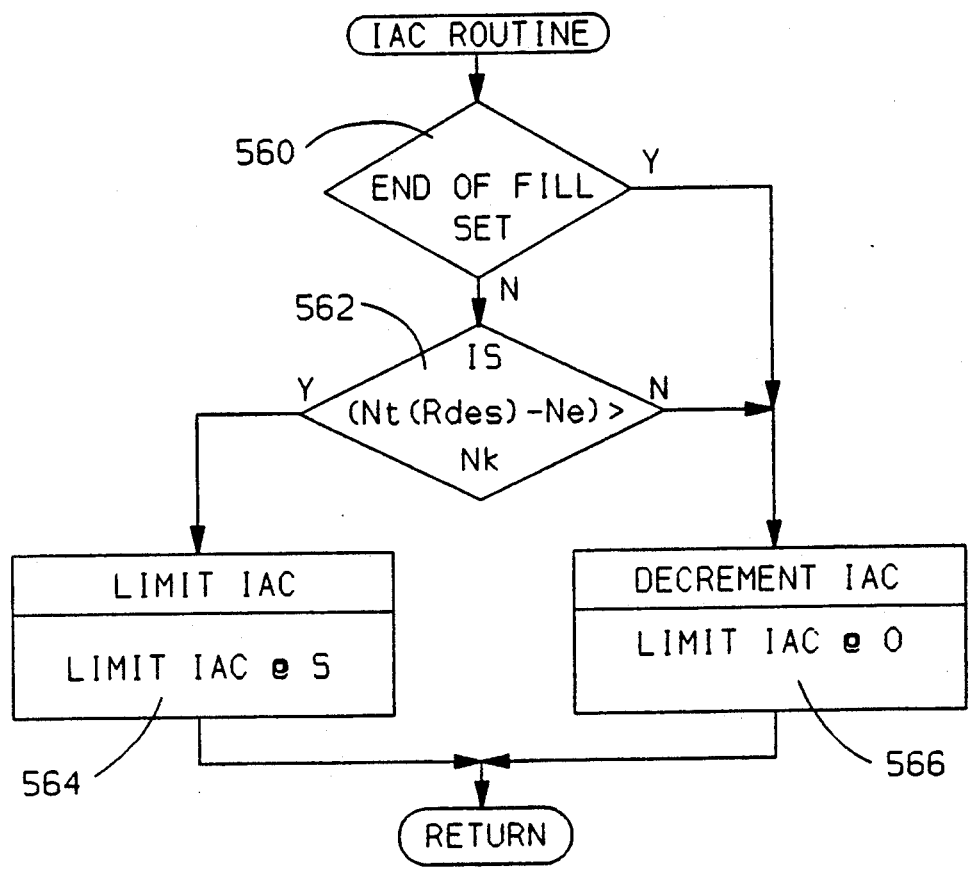

Referring to the IAC routine of FIG. 7, the decision block 560 is first executed to determine if the END OF FILL flag is set. Initially, of course, the END OF FILL flag will not be set, and the blocks 562-566 are executed to set the IAC command in closed-loop fashion to control the engine speed Ne to a value Nk lower than the synchronous speed Nt(Rdes). Thus, if the difference (Nt(Rdes)−Ne) is greater than the reference value Nk, the block 564 is executed to increment the IAC position command, limiting its value to the barometric pressure dependent limit setting S. If the difference (Nt(Rdes)−Ne) is less than the reference value Nk, the block 566 is executed to decrement the IAC position command, limiting its value to zero. Once the END OF FILL flag is set, only the block 566 is executed so as to progressively remove the increased idle air in anticipation of shift completion.

Figure 8A:
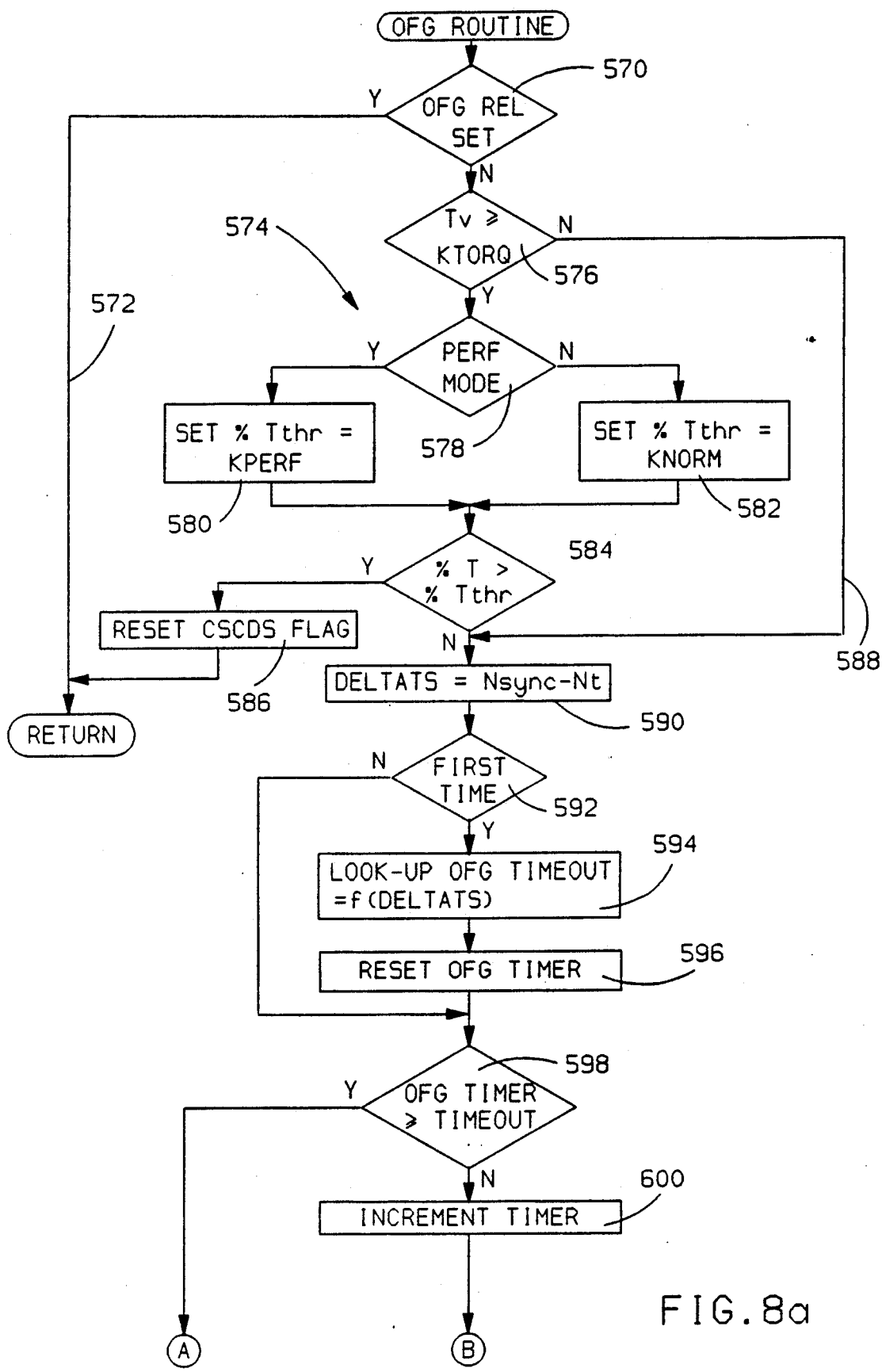
Figure 8B:
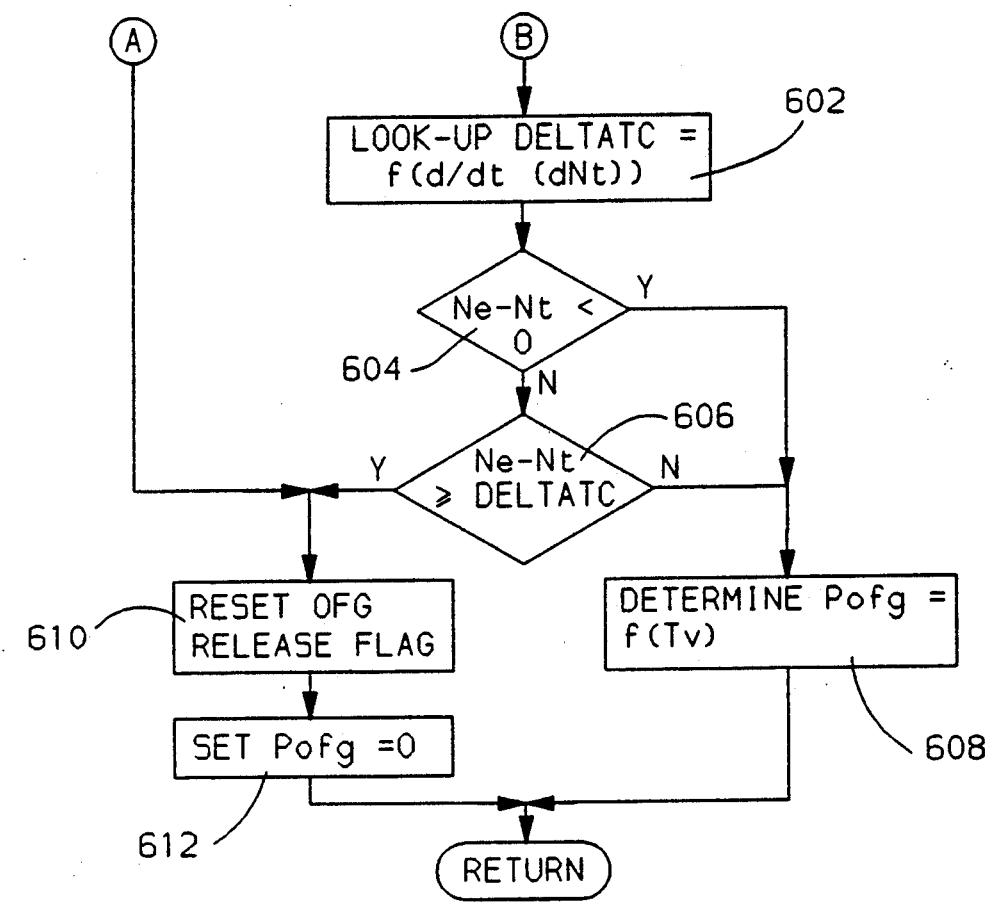

Referring to the OFG routine of FIGS. 8a-8b, the decision block 570 is first executed to determine if the OFG REL flag is set, indicating that the off-going clutch has been released. If so, execution of the routine is skipped, as indicated by the flow diagram line 572. If not, the flow diagram portion 574 comprising the blocks 576-586 is executed for transitioning to a power-on downshift in the event of a sudden increase in the throttle setting during the coast-sync-coast downshift. If the torque variable Tv is less than a reference torque KTORQ, as determined at block 576, the execution of blocks 578-586 is skipped as indicated by flow diagram line 588. Otherwise, the blocks 578-584 are executed to determine if the throttle setting %T exceeds a reference setting %Tthr. The blocks 580 and 582 choose a reference value specific to the driver mode preference—KPERF for the Performance mode and NORM for the Normal mode. If the throttle setting exceeds the reference %Tthr, the block 586 is executed to reset the CSC DS flag, and the shift is completed as a power-on downshift per block 532 of FIG. 6.

Following the execution of flow diagram portion 574, the block 590 is executed to update a term DELTATS representing the turbine speed change require to complete the shift. In the first loop of the shift, as determined at block 592, the blocks 594 and 596 are executed to determine an off-going time-out value TIMEOUT as a function of the initial value of DELTATS, and to reset the count in a timer, OFG TIMER. So long as the OFG TIMER count is less than TIMEOUT, as determined at block 598, the block 600 is executed to increment OFG TIMER, and the blocks 602-606 are executed to determine if the off-going clutch should be disengaged. The block 602 looks-up a reference torque converter slip value DELTATC based on the rate of change of the term dNt.

If the engine speed Ne is less than the turbine speed Nt, as determined by block 604, the block 608 is executed to determine a pressure command Pofg to maintain engagement of the off-going clutch. However, once the engine speed Ne is at least as great as the turbine speed Nt, the block 606 is executed to determine if the torque converter speed differential (Ne-Nt) exceeds the reference DELTATC. If not, the off-going clutch engagement is maintained as before. If so, the blocks 610-612 are executed to reset the OFG RELEASE flag and to disengage the off-going clutch by setting its pressure command Pofg to zero. As indicated above, the blocks 610-612 can be independently executed as a back-up measure if the count in OFG TIMER exceeds the reference TIMEOUT. Under normal circumstances, however, the slip condition of block 606 triggers the off-going release.

Figure 9:
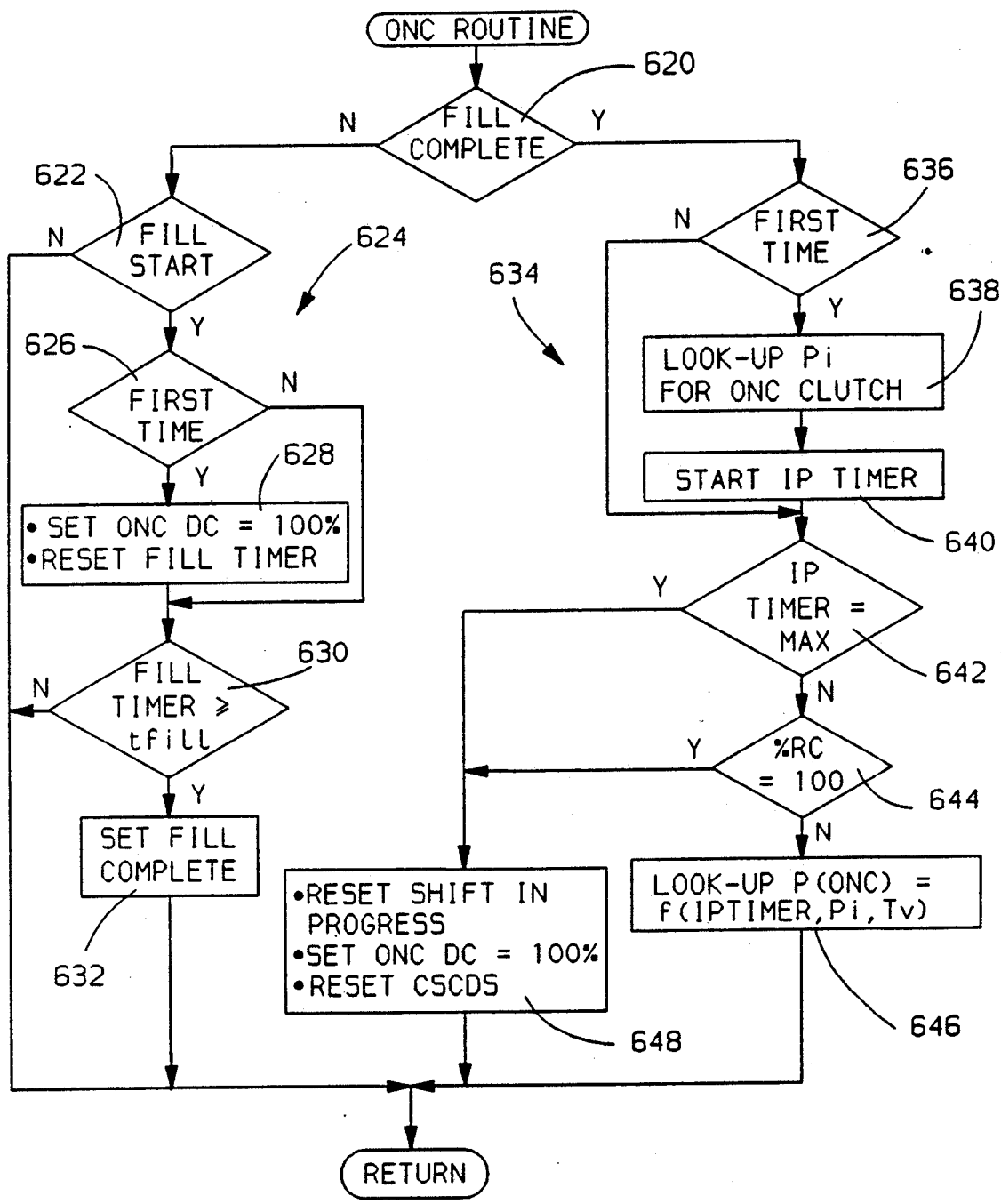

Referring finally to the on-coming ONC routine of FIG. 9, the block 620 is first executed to determine if the Fill phase of the shift is complete. If the FILL START flag is set, as determined at block 622, but the Fill phase is not complete, the flow diagram portion 624 is executed to complete the on-coming fill. In the first execution of the fill period, as detected by block 626, the block 628 is executed to set the on-coming duty cycle ONC DC to 100% and to reset the FILL TIMER.

Once the FILL TIMER exceeds the predefined fill time tfill, as determined at block 630, the block 632 is executed to set the FILL COMPLETE flag. Thereafter, the flow diagram portion 634 is executed to complete engagement of the on-coming clutch. In the first execution of the flow diagram portion 634, as determined at block 636, the blocks 638 and 640 are executed to determine the initial pressure Pi for the on-coming engagement, and to start the inertia phase timer, IP TIMER. Until the count in IP TIMER reaches a limit value MAX, or the percent of speed ratio completion %RC reaches 100%, as determined by blocks 642 and 644, respectively, the block 646 is executed to determine the on-coming pressure command P(ONC) as a function of IP TIMER, Pi and the torque variable Tv. Once either of the blocks 642-644 are answered in the affirmative, the block 648 is executed to complete the shift by setting the on-coming duty cycle ONC DC to 100%, and resetting the SHIFT IN PROGRESS and CSC DS flags.

While this invention has been described in reference to the illustrated embodiment, it is expected that various modifications will occur to those skilled in the art, and it should be understood that control methods incorporating such modifications may fall within the scope of this invention, which is defined by the appended claims.

The embodiments of the invention in which an exclusive property or privilege is claimed are defined as follows:

1. In a motor vehicle having an engine drivingly connected to a vehicle wheel through a fluid coupling and a multiple speed ratio transmission, the fluid coupling including an input element connected to the engine and an output element connected to the transmission, the transmission being downshifted from an upper speed ratio to a lower speed ratio by releasing an off-going friction device associated with the upper speed ratio and applying an on-coming friction device associated with the lower speed ratio, and the vehicle being operable in a coast mode where the vehicle wheel and transmission drive said output element faster than the engine drives said input element, a method of controlling the release and apply of the off-going and on-coming friction devices to downshift the transmission from the upper speed ratio to the lower speed ratio as the vehicle speed progressively decreases in the course of a coast mode of operation, the method comprising the steps of:
    initiating the downshift by progressively increasing a setting of an engine torque control from a preshift setting to effect a progressive increase in engine speed;
    monitoring a speed differential across the fluid coupling, and releasing the off-going friction device when such speed differential indicates that the engine will accelerate said output element; and
    when said output element reaches a target speed at which a speed differential across the on-coming friction device is substantially zero, applying the on-coming friction device and returning the engine torque control to said preshift setting to thereby complete the downshift.

2. The method set forth in claim 1, including the steps of:
    determining a time interval in relation to a change in speed of said output element required to carry out the downshift; and
    independently initiating the release of the off-going friction device if a shift time indication exceeds the determined time interval prior to a point at which said speed differential across the fluid coupling indicates that the engine will accelerate said output element.

3. The method set forth in claim 1, including the step of:
    determining a time interval in relation to a change in speed of said output element required to carry out the downshift; and
    independently initiating the apply of the on-coming friction device if a shift time indication exceeds the determined time interval prior to the output element reaching said target speed.

4. The method set forth in claim 1, wherein the apply of the on-coming friction device includes a fill phase during which the on-coming device is filled in preparation for torque transmission and a completion phase during which friction elements of the device are engaged for the transmission of torque, and the method includes the steps of:
    initiating said fill phase when said output element reaches a target speed at which the speed differential across the on-coming friction device is substantially zero, and thereafter during the fill phase, modulating the setting of the engine torque control to maintain said output element substantially at said target speed; and
    when the on-coming device is prepared for torque transmission, initiating said completion phase and returning the engine torque control to said preshift setting to thereby complete the downshift.

5. The method set forth in claim 1, including the step of:
    determining a time interval in relation to a change in speed of said output element required to carry out the downshift; and
    independently initiating said fill phase if a shift time indication exceeds the determined time interval prior to the output element reaching said target speed.

6. The method set forth in claim 1, wherein the engine includes a throttle for admitting intake air and an auxiliary air control unit for admitting additional intake air downstream of the throttle, and wherein the step of progressively increasing the setting of an engine torque control includes the step of progressively increasing a setting of the auxiliary air control unit to progressively increase the additional intake air thereby admitted.

7. The method set forth in claim 6, wherein the setting of the auxiliary air control unit is limited to a value determined in relation to the barometric pressure so that the additional intake air is limited at a flow which remains substantially constant regardless of changes in the barometric pressure.

8. In a motor vehicle having an engine drivingly connected to a vehicle wheel through a fluid coupling and a multiple speed ratio transmission, the fluid coupling including an input element connected to the engine, an output element connected to the transmission and a friction device which is normally engaged to couple said input and output elements, the transmission being downshifted from an upper speed ratio to a lower speed ratio by releasing an off-going friction device associated with the upper speed ratio and applying an on-coming friction device associated with the lower speed ratio, and the vehicle being operable in a coast mode where the vehicle wheel and transmission drive the engine, a method of controlling the release and apply of the off-going and on-coming friction devices to downshift the transmission from the upper speed ratio to the lower speed ratio as the vehicle speed progressively decreases in the course of a coast mode of operation, the method comprising the steps of:
    initiating the downshift by disengaging the friction device of the fluid coupling to permit the vehicle wheel and transmission to drive said output element faster than the engine drives said input element and progressively increasing a setting of an engine torque control from a preshift setting to effect a progressive increase in engine speed;

monitoring a speed differential across the fluid coupling, and releasing the off-going friction device when such speed differential indicates that the engine will accelerate said output element; and when said output element reaches a target speed at which a speed differential across the on-coming friction device is substantially zero, applying the on-coming friction device and returning the engine torque control to said preshift setting to thereby complete the downshift.

9. The method set forth in claim 8, including the step of re-engaging the friction device of the fluid coupling following the apply of the on-coming friction device.

10. In a motor vehicle having an engine drivingly connected to a vehicle wheel through a fluid coupling and a multiple speed ratio transmission, the fluid coupling including an input element connected to the engine and an output element connected to the transmission, the transmission being downshifted from an upper speed ratio to a lower speed ratio by releasing an off-going friction device associated with the upper speed ratio and engaging an on-coming friction device associated with the lower speed ratio, and the vehicle being operable in a coast mode where the vehicle wheel and transmission drive said output element faster than the engine drives said input element, a method of downshifting the transmission from the upper speed ratio to the lower speed ratio as the vehicle speed progressively decreases in the course of a coast mode of operation, the method comprising the steps of:

initiating a Preamble Phase of the downshift by progressively increasing an engine torque control from a preshift setting for effecting a progressive increase in engine speed;

initiating a Neutral Phase of the downshift by releasing said off-going friction device when a speed differential across the fluid coupling indicates that the engine will accelerate said output element;

initiating a Fill Phase of the downshift by preparing the on-coming friction device for engagement and returning the engine torque control to said preshift setting when said output element reaches a target speed at which a speed differential across the on-coming friction device is substantially zero; and initiating a Completion Phase of the downshift by applying the on-coming friction device upon completion of the Fill Phase, to thereby complete the downshift.

11. The method set forth in claim 10, including the step of:

modulating the setting of the engine torque control during the Fill Phase so as to maintain said output element substantially at said target speed.

* * * * *